United States Patent
Sasaki et al.

(10) Patent No.: US 12,446,334 B2
(45) Date of Patent: Oct. 14, 2025

(54) MANUFACTURING METHOD OF RADIATION IMAGING APPARATUS

(71) Applicant: CANON KABUSHIKI KAISHA, Tokyo (JP)

(72) Inventors: Yoshito Sasaki, Tokyo (JP); Tamaki Kobayashi, Kanagawa (JP); Masato Ofuji, Gunma (JP); Tomoyuki Oike, Kanagawa (JP); Masao Ina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 18/360,027

(22) Filed: Jul. 27, 2023

(65) Prior Publication Data

US 2024/0063247 A1   Feb. 22, 2024

(30) Foreign Application Priority Data

Aug. 17, 2022   (JP) .................. 2022-130123

(51) Int. Cl.
*H10F 39/00* (2025.01)
*G01T 1/202* (2006.01)
*H10F 39/18* (2025.01)

(52) U.S. Cl.
CPC .......... *H10F 39/011* (2025.01); *G01T 1/2023* (2013.01); *H10F 39/1898* (2025.01); *H10F 39/804* (2025.01)

(58) Field of Classification Search
CPC .. H10F 39/011; H10F 39/804; H10F 39/1898; G01T 1/2023
See application file for complete search history.

(56) References Cited

U.S. PATENT DOCUMENTS

| | | | |
|---|---|---|---|
| 8,686,361 B2 | 4/2014 | Nomura et al. | |
| 8,861,680 B2 | 10/2014 | Iwakiri et al. | |
| 2004/0178350 A1* | 9/2004 | Nagano | G01T 1/244 250/370.11 |
| 2004/0200973 A1* | 10/2004 | Ogawa | G01T 1/161 250/370.11 |
| 2007/0257198 A1* | 11/2007 | Ogawa | H10F 39/1898 250/370.11 |
| 2012/0187298 A1* | 7/2012 | Sasaki | H10F 39/1898 250/361 R |
| 2013/0087713 A1 | 4/2013 | Toyama et al. | |

(Continued)

FOREIGN PATENT DOCUMENTS

| | | |
|---|---|---|
| JP | 2012-173275 A | 9/2012 |
| WO | 2011/152194 A1 | 12/2011 |
| WO | 2020/229499 A1 | 11/2020 |

OTHER PUBLICATIONS

Extended European Search Report in European Application No. 23186986.8 (Jan. 2024).

*Primary Examiner* — Hugh Maupin
(74) *Attorney, Agent, or Firm* — Venable LLP

(57) ABSTRACT

A manufacturing method of a radiation imaging apparatus in which a sensor substrate and a scintillator are bonded by a bonding member, is provided. The method includes: forming, on a support substrate, a functional layer including a moisture preventing layer configured to suppress permeation of water; forming the scintillator on the support substrate with the functional layer arranged thereon; and separating, from the support substrate, at least a part of the scintillator together with the functional layer.

13 Claims, 7 Drawing Sheets

(56) References Cited

U.S. PATENT DOCUMENTS

2013/0112884 A1* 5/2013 Osawa .................. G01T 1/202
 250/366
2022/0221597 A1 7/2022 Beranger et al.
2023/0378097 A1 11/2023 Inoue et al.

* cited by examiner

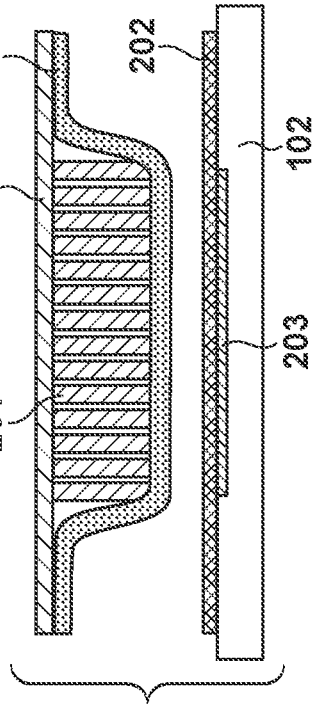
FIG. 4A
FIG. 4B
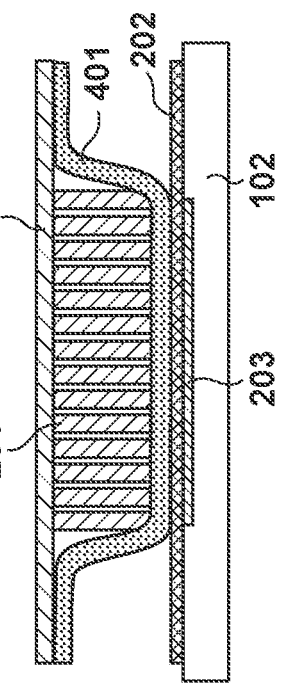
FIG. 4C
FIG. 4D
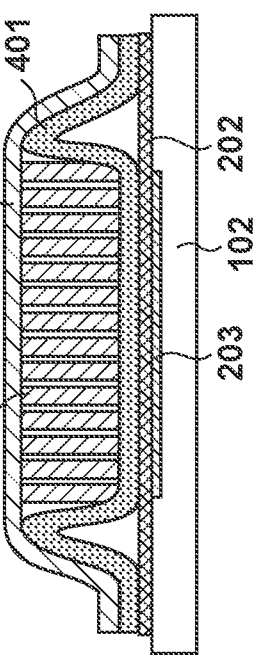
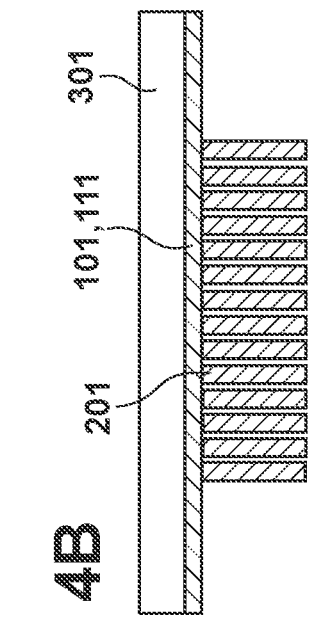
FIG. 4E
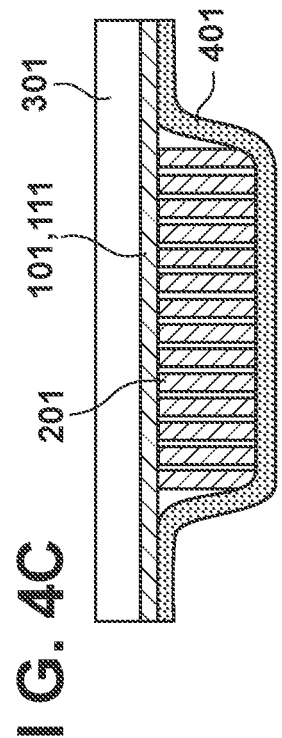
FIG. 4F
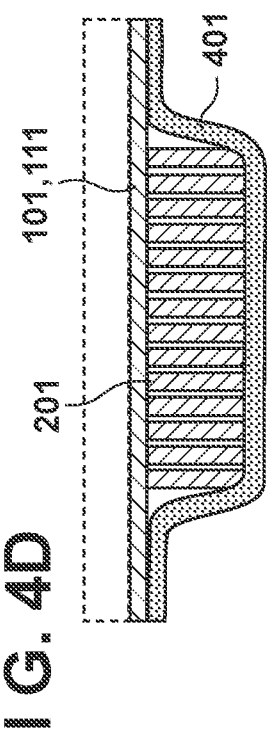
FIG. 4G

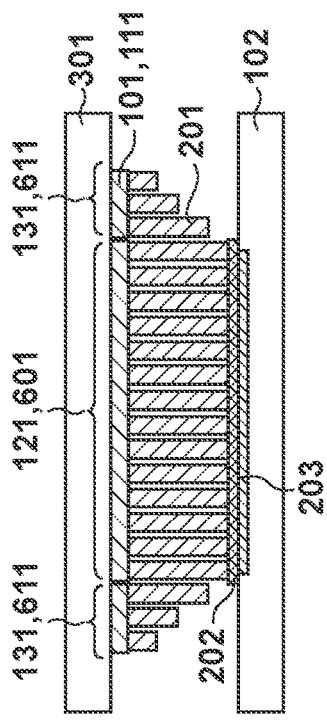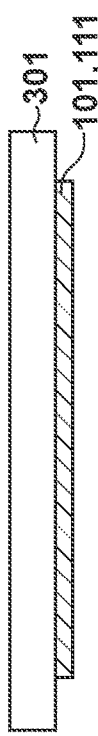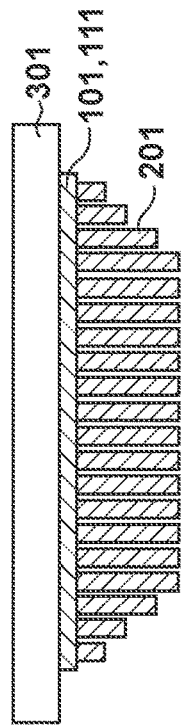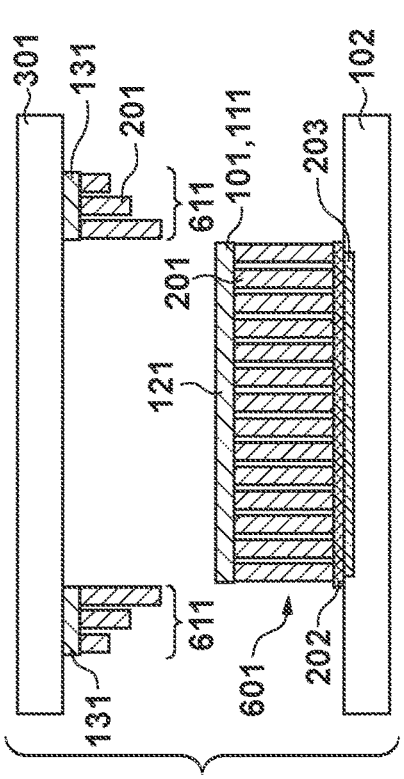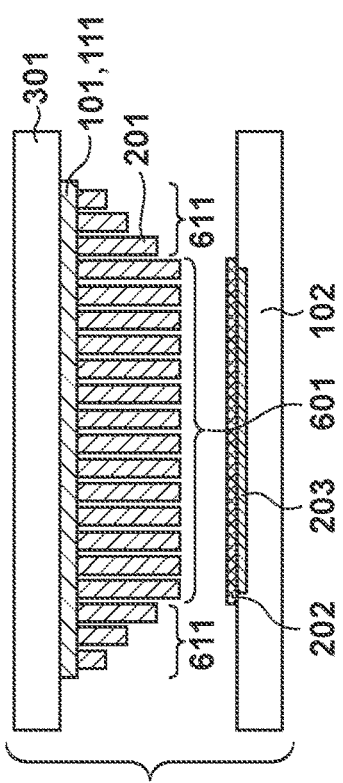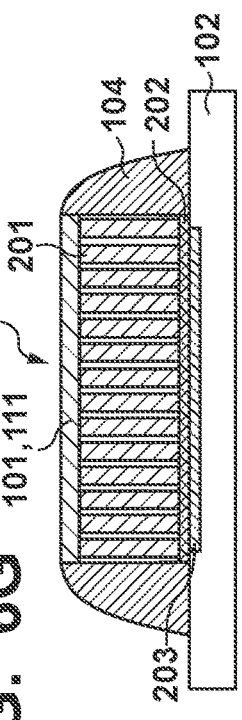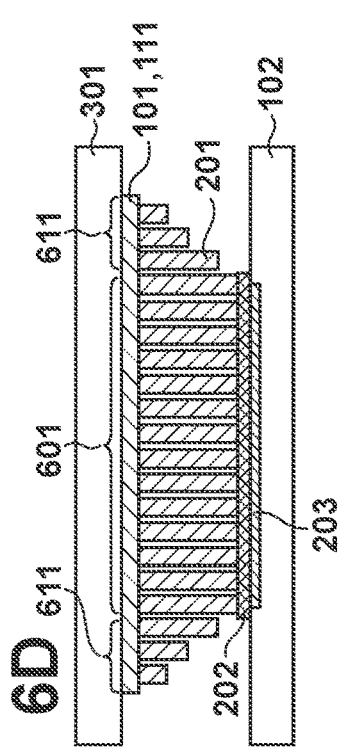

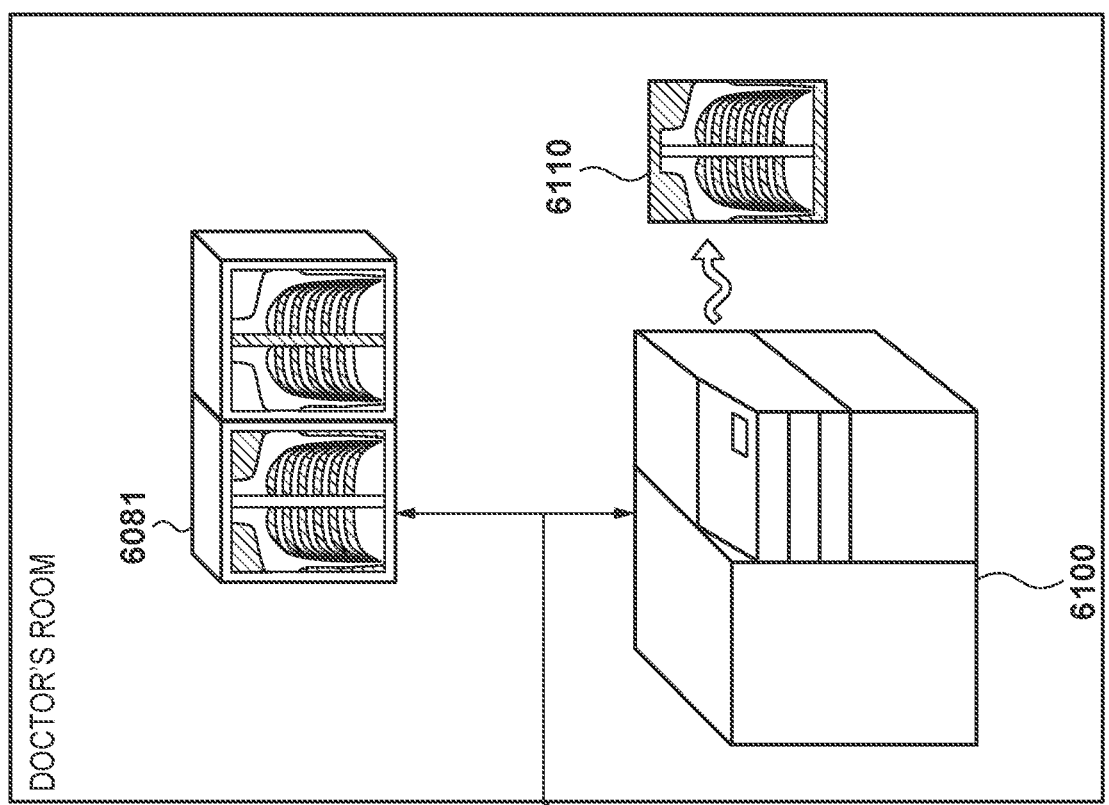
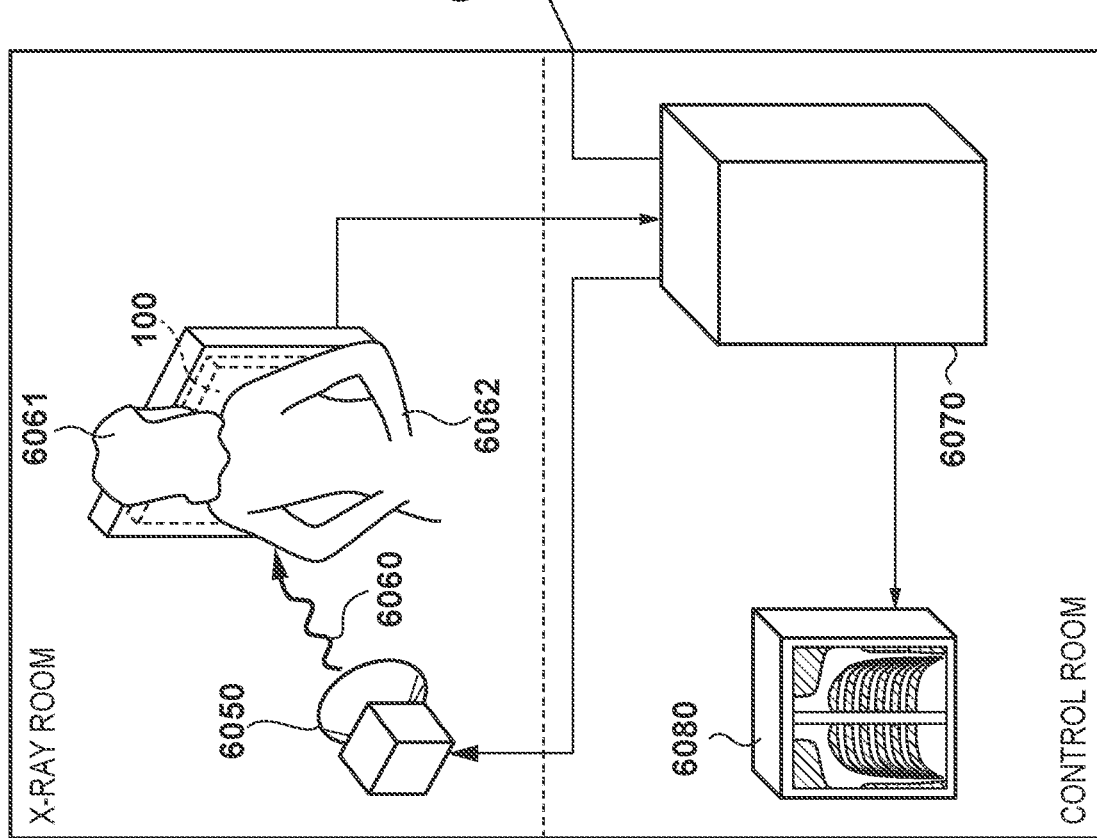
FIG. 8

MANUFACTURING METHOD OF RADIATION IMAGING APPARATUS

BACKGROUND OF THE INVENTION

Field of the Invention

The present invention relates to a manufacturing method of a radiation imaging apparatus.

Description of the Related Art

In medical image diagnosis or nondestructive inspection, a radiation imaging apparatus is widely used. International Publication No. 2020/229499 describes that, after forming a scintillator on a substrate for forming a scintillator, the formed scintillator is fixed to a sensor substrate, and then the substrate for forming a scintillator is separated from the scintillator. According to International Publication No. 2020/229499, since the substrate for forming a scintillator is not used in the radiation imaging apparatus, it is possible to select, as the material of the substrate, a material suitable for forming the scintillator without considering the radiation permeability and light reflectivity.

SUMMARY OF THE INVENTION

In the step described in International Publication No. 2020/229499, after the scintillator is formed, the upper surface and the side surface of the scintillator can be exposed to the outside air. Further, when separating the substrate for forming a scintillator from the scintillator, the surface of the scintillator which has been in contact with the substrate for forming a scintillator can also be exposed to the outside air. The scintillator may deliquesce with water contained in the outside air. If the surface of the scintillator exposed to the outside air increases, the characteristics of the scintillator may be further deteriorated.

Some embodiments of the present invention provide a technique advantageous in suppressing a deterioration in characteristics of a scintillator.

According to some embodiments, a manufacturing method of a radiation imaging apparatus in which a sensor substrate and a scintillator are bonded by a bonding member, the method comprising: forming, on a support substrate, a functional layer including a moisture preventing layer configured to suppress permeation of water; forming the scintillator on the support substrate with the functional layer arranged thereon; and separating, from the support substrate, at least a part of the scintillator together with the functional layer, is provided.

Further features of the present invention will become apparent from the following description of exemplary embodiments (with reference to the attached drawings).

BRIEF DESCRIPTION OF THE DRAWINGS

FIGS. 4A to 4G are views showing an example of steps of a manufacturing method according to a modification of the radiation imaging apparatus shown in FIG. 1;

FIGS. 6A to 6G are views showing an example of steps of a manufacturing method according to still another modification of the radiation imaging apparatus shown in FIG. 1;

FIG. 8 is a view showing an example of the configuration of a radiation imaging system using the radiation imaging apparatus shown in FIG. 1.

DESCRIPTION OF THE EMBODIMENTS

Figure 1:
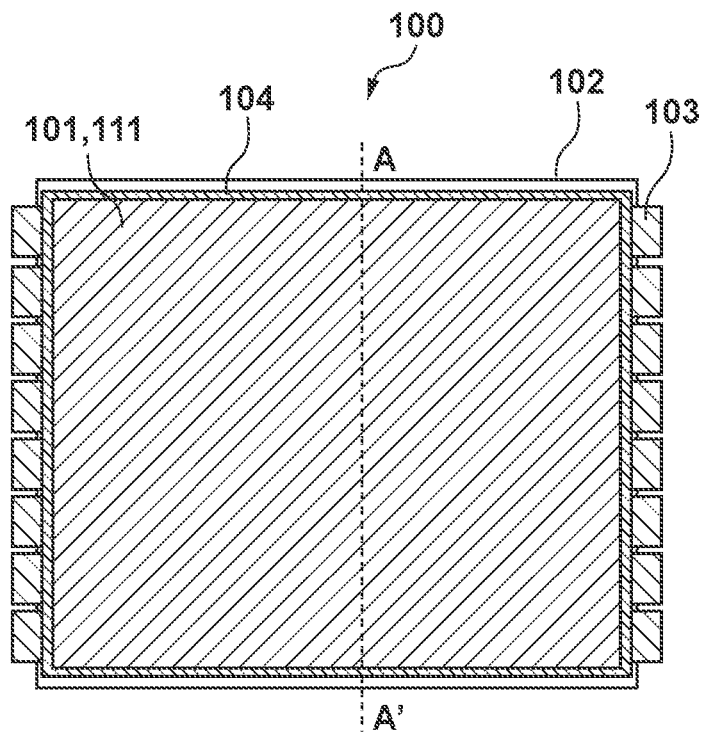
FIG. 1 is a plan view showing an arrangement example of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

Radiation in the present disclosure can include not only α-rays, β-rays, and γ-rays that are beams generated by particles (including photons) emitted by radioactive decay but also beams having equal or more energy, for example, X-rays, particle rays, and cosmic rays.

Figure 2:
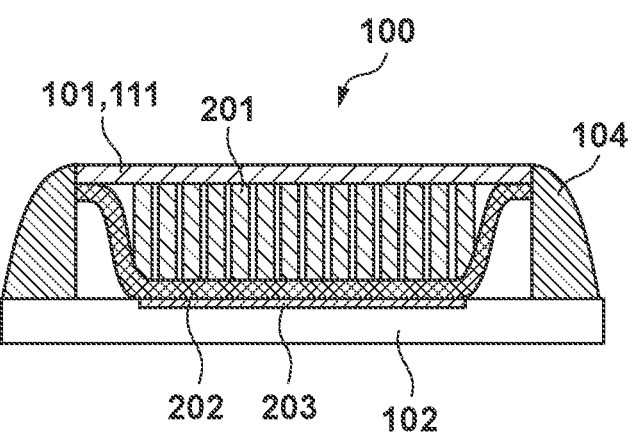
FIG. 2 is a sectional view showing the arrangement example of the radiation imaging apparatus shown in FIG. 1.

With reference to FIGS. 1 to 7B, a radiation imaging apparatus and a manufacturing method of the radiation imaging apparatus according to an embodiment of the present disclosure will be described. FIG. 1 is a plan view showing an arrangement example of a radiation imaging apparatus 100 according to the present disclosure. FIG. 2 is a sectional view taken along a line A-A' shown in FIG. 1. FIGS. 3A to 3F are sectional views showing an example of steps for manufacturing the radiation imaging apparatus 100.

In the radiation imaging apparatus 100, a sensor substrate 102 including a sensor region 203 where a plurality of pixels are arranged is bonded to a scintillator 201 by a bonding member 202. Each of the plurality of pixels arranged in the sensor region 203 can include a photoelectric conversion element, a switch element (for example, TFT) for capturing a signal corresponding to electric charges generated in the photoelectric conversion element, and the like. The photoelectric conversion element has sensitivity to light converted from radiation by the scintillator 201, and generates electric charges corresponding to the incident light. The plurality of pixels can be arrayed in the sensor region 203 so as to form rows and columns.

The sensor substrate 102 may be formed by arranging the sensor region 203 on an insulating base made of glass or the like. Alternatively, for example, a flexible base made of a resin such as polyimide may be used for the sensor substrate 102. As the sensor substrate 102, the sensor region 203 may be formed on a silicon substrate. In this case, a plurality of silicon substrates each arranged with the sensor region 203 may be fixed to one base to form the sensor substrate 102.

A sensor protective layer may be arranged on the surface of the sensor substrate 102 or the surface of the sensor region 203. For the sensor protective layer, silicon nitride, titanium oxide, lithium fluoride, aluminum oxide, magnesium oxide, or the like may be used. For the sensor protective layer, a polyphenylene sulfide resin, a fluorine resin, a polyetheretherketone resin, a liquid crystal polymer, a polyethernitrile resin, a polysulfone resin, a polyethersulfone resin, a polyarylate resin, or the like may also be used. Further, for the sensor protective layer, a polyamideimide resin, a polyetherimide resin, a polyimide resin, an epoxy resin, a silicone resin, an acrylic resin, or a composite containing these materials may be used. Note that, in order to allow the light converted from radiation by the scintillator 201 to pass through the sensor region 203, the sensor protective layer is made of a material having a high transmittance with respect to the wavelength of light generated by the scintillator 201.

Connection terminals 103 for extracting signals from the radiation imaging apparatus 100 are arranged in the outer periphery of the sensor substrate 102. The connection terminal 103 may be a rigid substrate or a flexible substrate. An appropriate wiring pattern can be arranged on the connection terminal 103.

Next, the manufacturing process of the radiation imaging apparatus 100 will be described. First, a support substrate 301 for forming the scintillator 201 is prepared. The sensor substrate 102 may be prepared at the same time. The support substrate 301 can be made of a highly rigid material. For the support substrate 301, for example, a highly transparent material such as glass or quartz may be used. The material of the support substrate 301 may be a resin material such as PET, polyurethane, polyimide, or polyamideimide as long as the material can withstand the heat during the vapor deposition step for forming the scintillator 201. Beryllium, magnesium, aluminum, titanium, iron, or an alloy containing these materials as a main component may also be used for the support substrate 301.

Figure 3A:
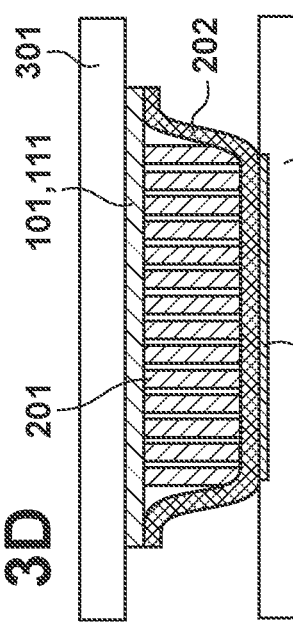
FIGS. 3A to 3F are views showing an example of steps of a manufacturing method of the radiation imaging apparatus shown in FIG. 1.

As shown in FIG. 3A, a functional layer 101 including a moisture preventing layer 111 for suppressing permeation of water is formed on the prepared support substrate 301. As the moisture preventing layer 111, for example, an organic material such as a silicone resin, an acrylic resin, or an epoxy resin, or a hot melt resin such as a polyester resin, a polyolefin resin, or a polyamide resin may be used. A resin having low water permeability, for example, an organic layer such as polyparaxylylene or a hot melt resin represented by a polyolefin resin is effective as the moisture preventing layer 111. As the moisture preventing layer 111, a protective film containing metal atoms, oxygen atoms, and a hydrophobic group may also be used.

Figure 3D:
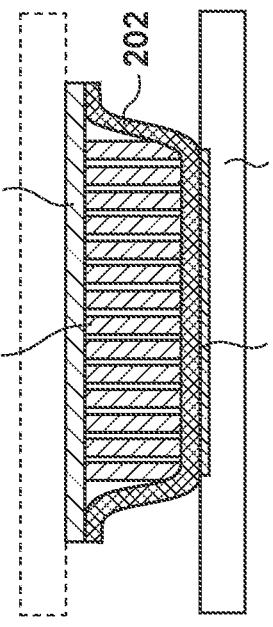
Figure 3B:
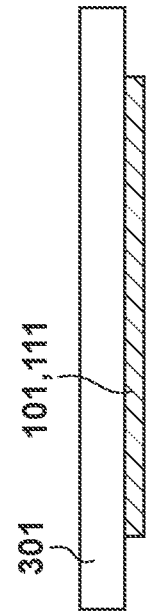

After the moisture preventing layer 111 (functional layer 101) is formed, as shown in FIG. 3B, the scintillator 201 is formed on the support substrate 301 with the functional layer 101 arranged thereon. The scintillator 201 converts the radiation having entered the scintillator 201 into light to which the pixels arranged on the sensor substrate 102 have sensitivity. The scintillator 201 may have a needle-like crystal structure including an alkali metal halide compound. The scintillator 201 having a needle-like crystal structure including an alkali metal halide compound as a main component may be, for example, cesium iodide (CsI:Tl) doped with thallium as an activator. However, the scintillator 201 is not limited to this, and may be sodium-activated cesium iodide (CsI:Na), cesium bromide (CsBr), or the like. However, the scintillator 201 is not limited to this, and another material may be used. The scintillator 201 may be formed on the support substrate 301 using a vapor deposition method. Alternatively, the scintillator 201 may be formed by any method such as sublimation, plasma deposition, atomization, growing in a liquid medium with solvent evaporation, or the like.

Figure 3E:
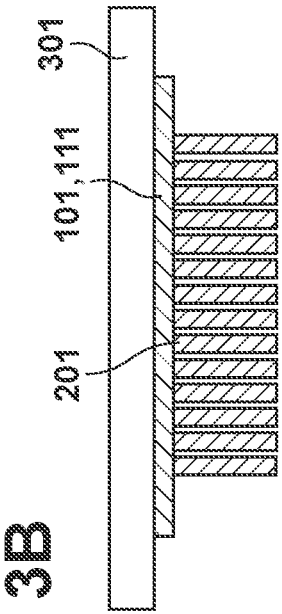
Figure 3C:
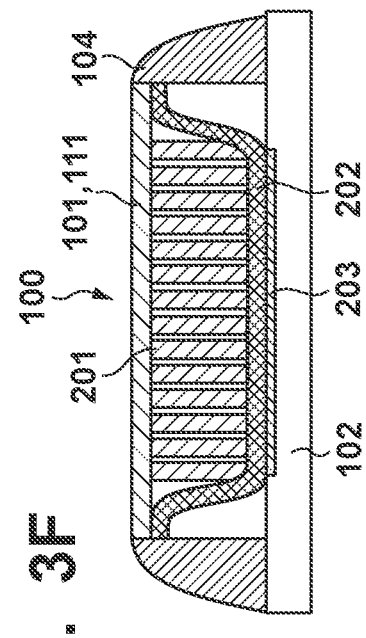

Then, the bonding member 202 is formed so as to cover the scintillator 201 as shown in FIG. 3C, and the sensor substrate 102 and the scintillator 201 are bonded via the bonding member 202 as shown in FIG. 3D. Various resin materials can be used for the bonding member 202. The bonding member 202 may be a thermoplastic resin. For example, a hot melt resin such as a polyester resin, a polyolefin resin, or a polyamide resin may be used for the bonding member 202. The scintillator 201 and the sensor substrate 102 may be bonded via the bonding member 202 by, for example, thermocompression-bonding.

As shown in FIG. 3C, the scintillator 201 may be sealed by the functional layer 101 and the bonding member 202. In this case, in order to lower the water permeability, the outer peripheral portion of the functional layer 101 and that of the bonding member 202 may be thermocompression-bonded, and the thickness of the bonding member 202 may be decreased accordingly. By bringing the functional layer 101 and the bonding member 202 into tight contact with each other, permeation of water from the outside air can be suppressed.

After the bonding step of bonding the sensor substrate 102 and the scintillator 201 using the bonding member 202, a separation step shown in FIG. 3E is performed. The separation step is a step of separating, from the support substrate 301, the scintillator 201 together with the functional layer 101. In the separation step, as shown in FIG. 3E, separation may be performed at the interface between the functional layer 101 and the support substrate 301. In this case, the separation step may include a step of decreasing the adhesive force at the interface between the support substrate 301 and the functional layer 101. For example, the separation step may be performed using a laser lift-off method. Another example of the configuration for decreasing the adhesive force at the interface between the support substrate 301 and the functional layer 101 will be described later as a separation layer 501.

Here, the effect of forming the scintillator 201 after forming the functional layer 101 on the support substrate 301 will be described. If the scintillator 201 is formed without forming the functional layer 101 on the support substrate 301 and then the separation step shown in FIG. 3E is performed, the surface of the scintillator 201, which has been in contact with the support substrate 301, can be exposed to the outside air. In a case in which a material mainly containing an alkali metal halide compound is used for the scintillator 201, if the scintillator 201 is exposed to the outside air, the scintillator 201 can deliquesce. If the scintillator 201 deliquesces, the resolution of the radiation imaging apparatus 100 can decrease. On the other hand, in this embodiment, before forming the scintillator 201 on the support substrate 301, the functional layer 101 including the moisture preventing layer 111 is arranged on the support substrate 301. Therefore, after the separation step, the surface of the scintillator 201 arranged on the support substrate 301 side is covered with the functional layer 101 so it is not exposed. That is, it can be suppressed that the surface of the scintillator 201 arranged on the support substrate 301 side is exposed to the outside air. As a result, it is possible to suppress a deterioration in characteristics of the scintillator 201 and a decrease in resolution of the radiation imaging apparatus 100. Further, water can cause a deterioration in characteristics of pixels arranged in the sensor region 203 of the sensor substrate 102. An example of the deterioration in characteristics of the sensor substrate 102 caused by water is corrosion of the metal used for the wiring pattern and the like. In this embodiment, even if a material that does not deliquesce with water is used as the scintillator 201, the functional layer 101 can suppress permeation of water from the surface of the scintillator 201 arranged on the support substrate 301 side. As a result, forming the functional layer 101 before forming the scintillator 201 can lead to an improvement in reliability of the radiation imaging apparatus 100.

For the moisture preventing layer 111 included in the functional layer 101, the above-described material can be used. However, the present invention is not limited to the above-described material, and any material may be used as the moisture preventing layer 111 as long as the material does not extremely absorb water in the outside air and supply the water to the interface with the scintillator 201 so that the above-described steps can be performed.

Figure 3F:
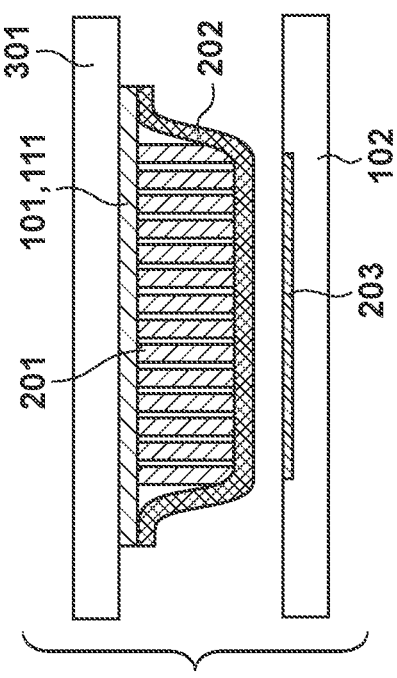

Then, as shown in FIG. 3F, a sealing member 104 may be arranged. For the sealing member 104, a resin having low water permeability may be used to improve the moisture preventing property of the scintillator 201. For example, an epoxy resin may be used for the sealing member 104. The resin used for the sealing member 104 may be changed in accordance with the sealing performance between the functional layer 101 and the bonding member 202 and the moisture preventing performance of a protective layer 401 (shown in FIG. 4) (to be described later) covering the scintillator 201. If the sealing performance between the functional layer 101 and the bonding member 202 is high or the moisture preventing performance of the protective layer 401 is high, a relatively moisture-permeable resin such as an elastic material among a silicone resin, an acrylic resin, and an epoxy resin can be used for the sealing member 104.

In the radiation imaging apparatus 100 shown in FIG. 3F, the functional layer 101 is exposed to the outside of the radiation imaging apparatus 100. Therefore, in addition of the moisture preventing function of suppressing permeation of water from the outside air, the functional layer 101 can have an impact protection function of suppressing destruction due to an impact. By arranging the functional layer 101 including the moisture preventing layer 111 using the resin or the like as described above, as compared to a case in which the scintillator 201 is exposed to the outside of the radiation imaging apparatus 100, the scintillator 201 is obviously protected from an impact.

Next, with reference to FIGS. 4A to 4G, a modification of the above-described radiation imaging apparatus 100 and a modification of the manufacturing process will be described. FIGS. 4A to 4G are views showing an example of steps for manufacturing the radiation imaging apparatus 100 according to this embodiment.

The steps shown in FIGS. 4A and 4B can be similar to the steps shown in FIGS. 3A and 3B described above. That is, the functional layer 101 including the moisture preventing layer 111 is formed before forming the scintillator 201 on the support substrate 301, and the scintillator 201 is formed on the support substrate 301 with the functional layer 101 formed thereon.

In this embodiment, after the scintillator 201 is formed, the protective layer 401 is formed so as to cover the scintillator 201 as shown in FIG. 4C. The protective layer 401 can have a function (for example, moisture preventing property or moisture resistance) of suppressing that the scintillator 201 absorbs moisture and deliquesces. As shown in FIG. 4C, the scintillator 201 may be sealed by the functional layer 101 and the protective layer 401.

As the material of the protective layer 401, a material similar to that of the moisture preventing layer 111 described above can be used. In addition to the moisture preventing function of suppressing permeation of water from the outside air to the scintillator 201, the protective layer 401 can implement an impact protection function of suppressing destruction due to an impact. Since the protective layer 401 is arranged between the scintillator 201 and the sensor region 203, it is necessary to consider scattering of light in the protective layer 401. Accordingly, the film thickness of the protective layer 401 may be about 10 nm to 50 μm.

The protective layer 401 may be formed after the scintillator 201 shown in FIG. 3B described above is formed. After the protective layer 401 is formed, the bonding member 202 as shown in FIG. 3C may be formed. By forming the bonding member 202 after the protective layer 401 is formed, the degree of freedom of the material used as the bonding member 202 can improve.

After the protective layer 401 is formed, as shown in FIG. 4D, the separation step of separating, from the support substrate 301, the scintillator 201 together with the functional layer 101 is performed. Also in this embodiment, after the separation step, the surface of the scintillator 201 arranged on the support substrate 301 side is covered with the functional layer 101 so it is not exposed. Therefore, it can be suppressed that the surface of the scintillator 201 arranged on the support substrate 301 side is exposed to the outside air. As a result, it is possible to suppress a deterioration in characteristics of the scintillator 201.

As compared to the separation step shown in FIG. 3E, the separation step shown in FIG. 4D is performed before the bonding step of bonding the sensor substrate 102 and the scintillator 201 via the bonding member 202. Therefore, as the functional layer 101, the material and film thickness having rigidity for supporting the scintillator 201 can be selected.

After the separation step, the sensor substrate 102 with the bonding member 202 arranged thereon is prepared as shown in FIG. 4E, and the sensor substrate 102 and the scintillator 201 are bonded via the bonding member 202 as shown in FIG. 4F. In the step shown in FIG. 4E, the bonding member 202 is arranged on the sensor substrate 102. However, the bonding member 202 may be arranged on the protective layer 401 to bond the sensor substrate 102 and the scintillator 201.

When bonding the sensor substrate 102 and the scintillator 201, as shown in FIG. 4G, the functional layer 101 and the protective layer 401 may also be bonded to the sensor substrate 102 via the bonding member 202. By bonding the functional layer 101 and the protective layer 401 to the sensor substrate 102 via the bonding member 202, the sealing performance in the outer peripheral portion of the radiation imaging apparatus 100 can improve.

Next, with reference to FIGS. 5A to 5G, another modification of the radiation imaging apparatus 100 described above and another modification of the manufacturing process will be described. FIGS. 5A to 5G are views showing an example of steps for manufacturing the radiation imaging apparatus 100 according to this embodiment.

In the embodiment described above, a case has been described in which the functional layer 101 has a single layer structure formed by the moisture preventing layer 111. However, the present invention is not limited to this. The functional layer 101 may include a reflective layer that reflects the light emitted from the scintillator 201. The functional layer 101 may also include, for example, an adhesion layer for improving the adhesion force with the scintillator 201. The functional layer 101 may further include, for example, a separation layer for facilitating separation from the support substrate 301. The functional layer 101 may have a stacked structure further including at least one of the reflective layer, the adhesion layer, and the separation layer in addition to the moisture preventing layer 111. Alternatively, any one of the reflective layer, the adhesion layer, and the separation layer may have the function of the moisture preventing layer 111. For example, a stacked structure of the reflective layer and the adhesion layer may be equivalent to a stacked structure of the reflective layer and the moisture preventing layer 111, or may be equivalent to a stacked structure of the moisture preventing layer 111 and the adhesion layer.

Figure 5A:
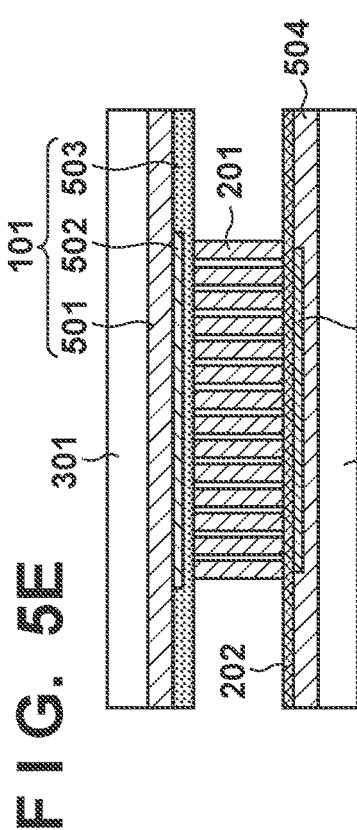
FIGS. 5A to 5G are views showing an example of steps of a manufacturing method according to another modification of the radiation imaging apparatus shown in FIG. 1.
Figure 5B:
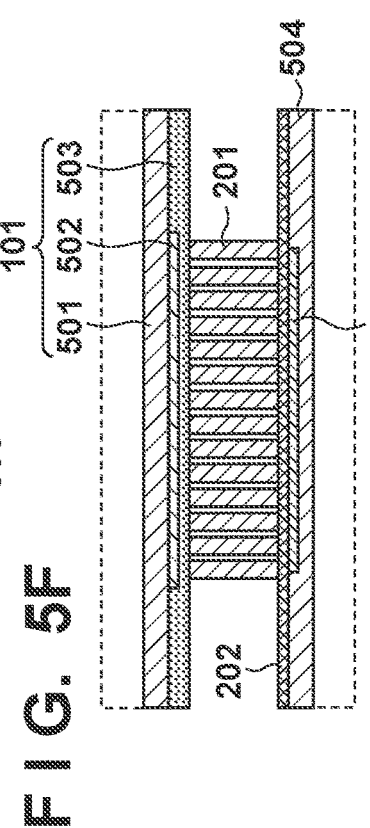

In this embodiment, first, the separation layer 501 is formed on the support substrate 301 as shown in FIG. 5A. Then, a reflective layer 502 and an adhesion layer 503 are formed as shown in FIG. 5B. As has been described above, any one of the separation layer 501, the reflective layer 502, and the adhesion layer 503 may function as the moisture preventing layer 111. Alternatively, for example, a combination of the reflective layer 502 and the adhesion layer 503 may function as the moisture preventing layer 111. As has been described above, any material that does not extremely absorb water in the outside air and supply the water to the interface with the scintillator 201 can function as the moisture preventing layer 111. A bonding layer (adhesive layer) using an adhesive agent or the like may be arranged between the layers forming the functional layer 101, for example, between the separation layer 501 and the reflective layer 502 or between the reflective layer 502 and the adhesion layer 503.

For the separation layer 501, for example, a structure can be used in which a bonding layer such as an adhesive agent, which facilitates separation from the support substrate 301, is arranged on the support substrate 301 side of a base such as a flexible film. As the bonding layer arranged on the support substrate 301 side of the base of the separation layer 501, for example, a material whose adhesion force is decreased by heat or electricity, a material whose adhesion force is decreased by irradiation of UV or ultraviolet rays, a material whose adhesion force is decreased by being ablated by laser irradiation, or the like is used. For the base of the separation layer 501, for example, a heat resistant material such as polyimide or polyamideimide can be used. The base of the separation layer 501 using the above-described material can be formed by, for example, applying and curing the material of the base on the support substrate 301 with the bonding layer of the separation layer 501 formed thereon. Alternatively, the separation layer 501 may be formed on the support substrate 301 by adhering the sheet-like separation layer 501 to the support substrate 301.

The reflective layer 502 may be, for example, a metal layer such as aluminum. The reflective layer 502 may be formed on the support substrate 301 using a vapor deposition method or a sputtering method. Alternatively, the reflective layer 502 may be formed on the support substrate 301 by, for example, adhering a film formed with a metal layer to the support substrate 301.

A material that increases the adhesion force with the scintillator 201 can be selected as the adhesion layer 503. For the adhesion layer 503, silicon nitride, titanium oxide, lithium fluoride, aluminum oxide, magnesium oxide, or the like may be used. For the adhesion layer 503, a polyphenylene sulfide resin, a polyetheretherketone resin, a liquid crystal polymer, a polyethernitrile resin, a polysulfone resin, a polyethersulfone resin, a polyarylate resin, or the like may also be used. Further, for the adhesion layer 503, a polyamideimide resin, a polyetherimide resin, a polyimide resin, an epoxy resin, a silicone resin, an acrylic resin, or a composite containing these materials may be used. The functional layer 101 may be formed not only before forming the scintillator 201, but may also be additionally formed, for example, after the separation step of separating the scintillator 201 from the support substrate 301.

Figure 5C:
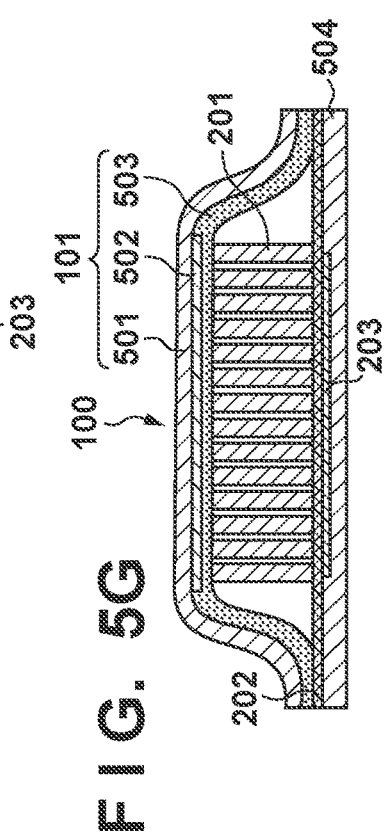

After the functional layer 101 is formed, the scintillator 201 is formed as shown in FIG. 5C. After the scintillator 201 is formed, the above-described protective layer 401 may be formed.

Figure 5D:
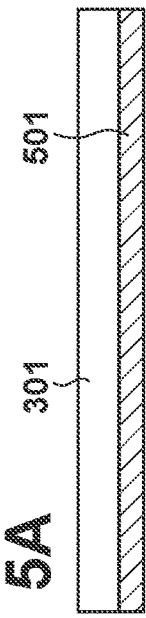

Then, the bonding step of bonding a sensor substrate 504 and the scintillator 201 via the bonding member 202 is performed. In the arrangement shown in FIG. 5D, a flexible base made of a resin such as polyimide is used for the sensor substrate 504. In this case, the sensor substrate 504 can also be called a film sensor or the like. Considering the process condition and handling ability in each manufacturing step, the sensor substrate 504 may be supported by a support substrate 506 as shown in FIG. 5D.

Figure 5E:
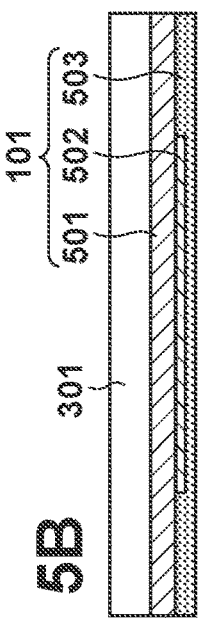
Figure 5F:
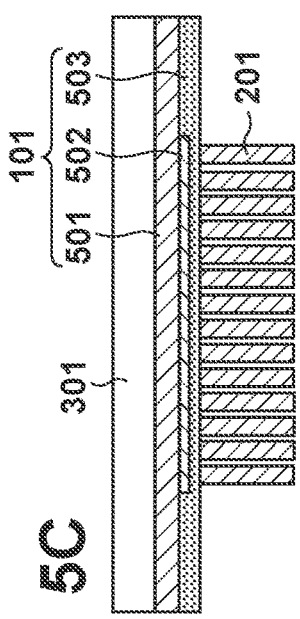

As shown in FIG. 5E, the separation step is performed after the sensor substrate 504 and the scintillator 201 are bonded. In the separation step, as shown in FIG. 5F, separation can be performed at the interface between the support substrate 301 and the separation layer 501 of the functional layer 101. For example, the support substrate 301 may be removed from the separation layer 501 using a laser lift-off method. In addition, the support substrate 506 may be separated from the sensor substrate 504 as shown in FIG. 5F. The support substrate 506 may be removed from the sensor substrate 504 after the support substrate 301 is removed from the scintillator 201 (separation layer 501). Alternatively, the support substrate 301 may be removed from the scintillator 201 (separation layer 501) after the support substrate 506 is removed from the sensor substrate 504.

Figure 5G:
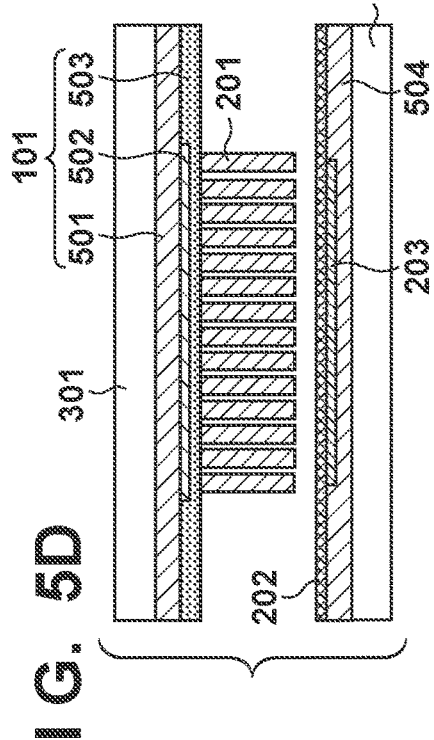

Then, as shown in FIG. 5G, the scintillator 201 is sealed by bonding the functional layer 101 and the sensor substrate 504 via the bonding member 202. Also in this embodiment, after the separation step, the surface of the scintillator 201 arranged on the support substrate 301 side is covered with the functional layer 101 so it is not exposed. Therefore, it can be suppressed that the surface of the scintillator 201 arranged on the support substrate 301 side is exposed to the outside air. As a result, it is possible to suppress a deterioration in characteristics of the scintillator 201.

Next, with reference to FIGS. 6A to 6G, still another modification of the radiation imaging apparatus 100 described above and still another modification of the manufacturing process will be described. FIGS. 6A to 6G are views showing an example of steps for manufacturing the radiation imaging apparatus 100 according to this embodiment.

The above-described embodiments describe an example in which the entire scintillator 201 formed on the support substrate 301 is transferred to the sensor substrate 102 or 504. However, the present invention is not limited to this. As shown in FIG. 6C, the scintillator 201 can include a central portion 601 formed with a constant film thickness, and a peripheral portion 611 where the film thickness decreases. Therefore, the central portion 601 of the scintillator 201 where the film thickness is substantially constant may be transferred to the sensor substrate 102 or 504.

First, as in the steps shown in FIGS. 3A and 4A described above, the functional layer 101 including the moisture preventing layer 111 is formed on the support substrate 301 as shown in FIG. 6A. As has been described above, the functional layer 101 may include the separation layer 501, the reflective layer 502, the adhesion layer 503, and the like. Then, as in the steps shown in FIGS. 3B and 4B described above, the scintillator 201 is formed on the support substrate 301 with the functional layer 101 formed thereon as shown in FIG. 6B. After the scintillator 201 is formed, the protective layer 401 may be formed.

Then, as shown in FIGS. 6C and 6D, the bonding step of bonding the sensor substrate 102 and the scintillator 201 is performed. At this time, as shown in FIG. 6C, the bonding member 202 may be arranged only at the position on the sensor substrate 102 facing the central portion 601 of the scintillator 201. Alternatively, for example, the bonding member 202 may be arranged in a region (for example, entire surface), which is larger than the central portion 601 of the scintillator 201, of the surface of the sensor substrate 102 facing the scintillator 201. Since the film thickness decreases in the peripheral portion 611 of the scintillator 201, the peripheral portion 611 is unlikely to contact the bonding member 202. The bonding step may be performed while arranging the bonding member 202 on the scintillator 201. The scintillator 201 and the sensor region 203 of the sensor substrate 102 are aligned, and the sensor substrate 102 and the scintillator 201 are bonded via the bonding member 202. At this time, a part (central portion 601) of the scintillator 201 is bonded to the sensor substrate 102.

Then, a portion 121 of the functional layer 101 arranged between the central portion 601 of the scintillator 201 and the support substrate 301 is cut from a portion 131 of the functional layer 101 arranged between the peripheral portion 611 of the scintillator 201 and the support substrate 301. The portion 121 of the functional layer 101 only need to be cut from the portion 131 before the separation step of separating the scintillator 201 from the support substrate 301. For example, the portion 121 of the functional layer 101 may be cut from the portion 131 before the step of forming the scintillator 201 shown in FIG. 6B. The portion 121 of the functional layer 101 may be cut from the portion 131 by, for example, blade processing, laser processing, or the like.

Then, as shown in FIG. 6F, the separation step is performed. In the separation step, a part (central portion 601) of the scintillator 201 is separated from the support substrate 301, and the remaining part (peripheral portion 611) of the scintillator 201 remains on the support substrate 301. Similarly, the portion 121 of the functional layer 101 is separated from the support substrate 301 together with the central portion 601 of the scintillator 201, and the portion 131 remains on the support substrate 301 together with the peripheral portion 611 of the scintillator 201.

After the separation step, the sealing member 104 is formed so as to cover the outer edge portion of the scintillator 201 as shown in FIG. 6G, thereby sealing the scintillator 201. Also in this embodiment, after the separation step, the surface of the scintillator 201 arranged on the support substrate 301 side is covered with the functional layer 101 so it is not exposed. Therefore, it can be suppressed that the surface of the scintillator 201 arranged on the support substrate 301 side is exposed to the outside air. As a result, it is possible to suppress a deterioration in characteristics of the scintillator 201.

Figure 7A:
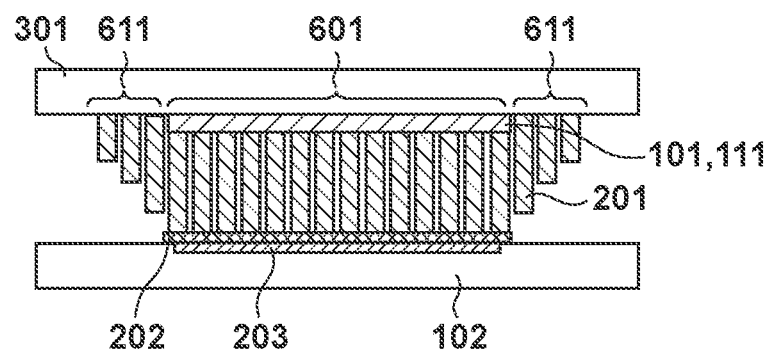
FIGS. 7A and 7B are views showing an example of steps of a manufacturing method according to still another modification of the radiation imaging apparatus shown in FIGS. 6A to 6G.

In order to separate the central portion 601 of the scintillator 201 from the support substrate 301, in the steps described with reference to FIGS. 6A to 6G, the portion 121 of the functional layer 101 is cut from the portion 131 before the separation step. However, the present invention is not limited to this. For example, as shown in FIG. 7A, the functional layer 101 may be arranged at a position corresponding to the central portion 601 of the scintillator 201 formed on the support substrate 301. That is, the functional layer 101 and the scintillator 201 may be formed on the support substrate 301 such that the peripheral portion 611 of the scintillator 611, which is not to be bonded to the sensor substrate 102 in the bonding step, contacts the support substrate 301 without intervening the functional layer 101. Then, as shown in FIG. 7B, in the separation step, the central portion 601 of the scintillator 201 and the functional layer 101 are separated from the support substrate 301, and the peripheral portion 611 of the scintillator 201 remains on the support substrate 301.

Figure 7B:
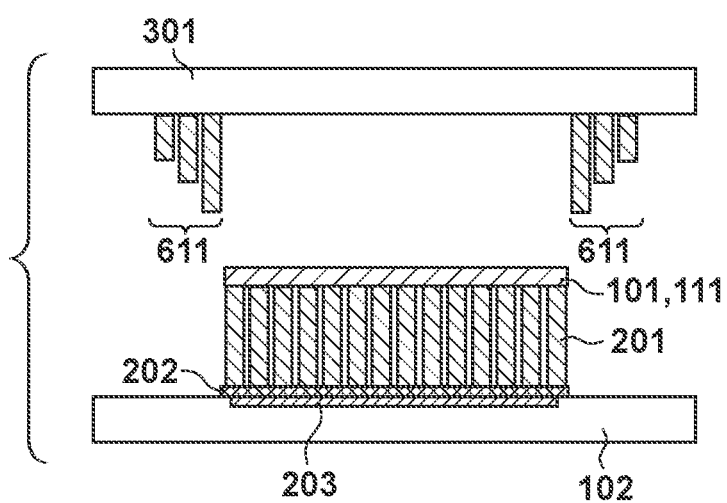

Since the steps shown in FIGS. 7A and 7B do not include the step of separating the functional layer 101, the number of steps for manufacturing the radiation imaging apparatus 100 can be reduced. If the functional layer 101 includes the separation layer 501 in contact with the support substrate 301, the functional layer 101 can be easily removed from the support substrate 301. On the other hand, the peripheral portion 611 of the scintillator 201, which is in contact with the support substrate 301, can adhere to the support substrate 301. Therefore, the separation step of separating the central portion 601 of the scintillator 201 and the functional layer 101 from the support substrate 301 and leaving the peripheral portion 611 of the scintillator 201 on the support substrate 301 can be more easily performed.

The structures and manufacturing processes of the radiation imaging apparatus 100 shown in FIGS. 3A to 7B can be appropriately combined. For example, in the structures and the processes shown in FIGS. 3A to 5G, a part (for example, central portion 601) of the scintillator 201 may be bonded to the sensor substrate 102 via the bonding member 202. Alternatively, for example, the sensor substrate 504 supported by the support substrate 506 in the manufacturing process shown in FIGS. 5A to 5G may be applied to the radiation imaging apparatus 100 shown in FIGS. 3A to 3F, FIGS. 4A to 4G, FIGS. 6A to 6G, or FIGS. 7A and 7B.

A radiation imaging system incorporating the above-described radiation imaging apparatus 100 will exemplarily be described below with reference to FIG. 8. X-rays 6060 generated by an X-ray tube 6050 serving as a radiation source for emitting radiation to the radiation imaging apparatus 100 pass through a chest 6062 of a patient or object 6061 and enter the radiation imaging apparatus 100. The incident X-rays include the internal body information of the patient or object 6061. In the radiation imaging apparatus 100, the scintillator 201 emits light in response to the incidence of the X-rays 6060, and the emitted light is photoelectrically converted by photoelectric conversion elements to obtain electrical information. This information is converted into digital data, undergoes image processing by an image processor 6070 serving as a signal processing unit, and can be observed on a display 6080 serving as a display unit in a control room.

Also, this information can be transferred to a remote place by a transmission processing unit such as a telephone network 6090. This allows the information to be displayed on a display 6081 serving as a display unit in a doctor's office or the like in another place, and allows a doctor who is in a remote place to make a diagnosis. In addition, the information can be recorded on a recording medium such as an optical disk, and a film processor 6100 can also record the information on a film 6110 serving as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-130123, filed Aug. 17, 2022 which is hereby incorporated by reference herein in its entirety.

What is claimed is:

1. A manufacturing method of a radiation imaging apparatus in which a sensor substrate and a scintillator are bonded by a bonding member, the method comprising:
   forming, on a support substrate, a functional layer including a moisture preventing layer configured to suppress permeation of water;
   forming the scintillator on the support substrate with the functional layer arranged thereon;
   bonding the sensor substrate and the scintillator via the bonding member; and
   separating, from the support substrate, at least a part of the scintillator together with the functional layer,
   wherein:
   the separating is performed after the bonding;
   in the bonding, a part of the scintillator is bonded to the sensor substrate;
   in the separating, the part of the scintillator and the functional layer are separated from the support substrate, and a remaining part of the scintillator remains on the support substrate; and
   the remaining part of the scintillator is in contact with the support substrate without intervening the functional layer.

2. The method according to claim 1, wherein in the separating, separation is performed at an interface between the functional layer and the support substrate.

3. The method according to claim 1, further comprising forming a protective layer so as to cover the scintillator after the scintillator is formed,
   wherein the scintillator is sealed by the functional layer and the protective layer.

4. The method according to claim 1, wherein the scintillator is sealed by the functional layer and the bonding member.

5. The method according to claim 1, wherein the functional layer further includes at least one of a reflective layer configured to reflect light emitted from the scintillator, an adhesion layer configured to improve an adhesion force with the scintillator, and a separation layer configured to facilitate separation from the support substrate.

6. The method according to claim 5, wherein the functional layer has a stacked structure.

7. The method according to claim 1, wherein the separating includes decreasing an adhesive force at an interface between the support substrate and the functional layer.

8. The method according to claim 1, wherein the separating is performed using a laser lift-off method.

9. The method according to claim 1, wherein the scintillator has a needle-like crystal structure including an alkali metal halide compound.

10. A manufacturing method of a radiation imaging apparatus in which a sensor substrate and a scintillator are bonded by a bonding member, the method comprising:
    forming, on a support substrate, a functional layer including a moisture preventing layer configured to suppress permeation of water;
    forming the scintillator on the support substrate with the functional layer arranged thereon;
    bonding the sensor substrate and the scintillator via the bonding member; and
    separating, from the support substrate, at least a part of the scintillator together with the functional layer,
    wherein:
    the separating is performed after the bonding;
    in the bonding, a part of the scintillator is bonded to the sensor substrate;
    in the separating, the part of the scintillator is separated from the support substrate, and a remaining part of the scintillator remains on the support substrate;
    the functional layer includes a first portion which is separated from the support substrate together with the part of the scintillator in the separating, and a second portion which remains on the support substrate together with the remaining part of the scintillator in the separating; and
    the method further comprises cutting the first portion of the functional layer from the second portion thereof before the separating.

11. A manufacturing method of a radiation imaging apparatus in which a sensor substrate and a scintillator are bonded by a bonding member, the method comprising:
    forming, on a support substrate, a functional layer including a moisture preventing layer configured to suppress permeation of water;
    forming the scintillator on the support substrate with the functional layer arranged thereon;
    separating, from the support substrate, at least a part of the scintillator together with the functional layer; and
    bonding the sensor substrate and the scintillator via the bonding member,
    wherein the separating is performed before the bonding.

12. The method according to claim 11, further comprising forming a protective layer so as to cover the scintillator after the scintillator is formed and before the bonding,
    wherein the scintillator is sealed by the functional layer and the protective layer.

13. A manufacturing method of a radiation imaging apparatus in which a sensor substrate and a scintillator are bonded by a bonding member, the method comprising:
    forming, on a support substrate, a functional layer including a moisture preventing layer configured to suppress permeation of water;
    forming the scintillator on the support substrate with the functional layer arranged thereon; and
    separating, from the support substrate, at least a part of the scintillator together with the functional layer,
    wherein the separating includes decreasing an adhesive force at an interface between the support substrate and the functional layer.

* * * * *